United States Patent
Volberding

[11] 3,717,111
[45] Feb. 20, 1973

[54] ADJUSTABLE SNACK TRAY

[76] Inventor: William L. Volberding, 1844 Eckerman Avenue, West Covina, Calif. 91791

[22] Filed: June 4, 1971

[21] Appl. No.: 150,057

[52] U.S. Cl. ................................................. 108/45
[51] Int. Cl. ............................................... A47b 23/00
[58] Field of Search ............. 108/43, 48, 145, 72, 75; 297/246, 247, 248, 269, 421, 50; 248/266; 296/22–24

[56] References Cited

UNITED STATES PATENTS

| | | | |
|---|---|---|---|
| 1,215,261 | 2/1917 | Dyke | 312/246 X |
| 1,317,274 | 9/1919 | Dierkes | 312/266 |
| 2,391,872 | 1/1946 | Berg | 248/421 X |
| 2,635,030 | 4/1953 | Stebbins et al. | 312/266 UX |
| 2,657,107 | 10/1953 | Bisaga et al. | 108/45 |
| 3,406,999 | 10/1968 | Kozicki | 312/266 X |
| 3,104,895 | 9/1963 | Feuerbach et al. | 281/44 |
| 3,606,112 | 9/1971 | Cheshier | 108/45 |

*Primary Examiner*—Casmir A. Nunberg
*Assistant Examiner*—Glenn O. Finch
*Attorney*—McCarthy, Depaoli, O'Brien & Price

[57] ABSTRACT

A horizontally and vertically adjustable tray or shelf and support means therefor particularly suitable for installation in a motor vehicle in such a manner that it can be stored in a compact form out of the way of the occupants, and which maintains the tray or shelf level while permitting its position to be adjusted horizontally and vertically so as to position it convenient to the occupants of the vehicle for placing snacks or other articles thereon. In the preferred embodiment, the device comprises a pair of guide rods, or other suitable guide means, adapted to be attached to the vehicle, preferably to the dash (or fire wall between the engine and the passenger compartment) and which extend horizontally therefrom back toward the passenger compartment. A slide element or member is mounted on these guide means and is slidable longitudinally thereon. One end of each of a pair of primary parallel links are pivotally attached with their pivots disposed vertically to a vertical plate on the slide member. The other end of each of the pair of primary parallel links are attached and pivoted, with the pivots disposed vertically, to a triangular, vertical connecting plate. One end of each of a pair of secondary parallel links are attached and pivoted, with the pivots disposed horizontally to the connecting plate while the other end of each of the pair of secondary parallelogram links are attached and pivoted, with the pivots disposed horizontally, to a vertical plate extending down from the tray or suitable support for the tray.

9 Claims, 6 Drawing Figures

INVENTOR
WILLIAM L. VOLBERDING

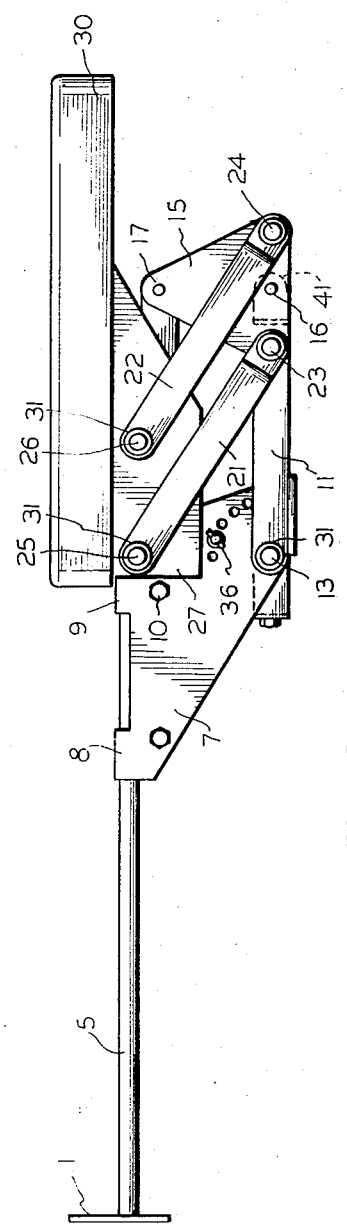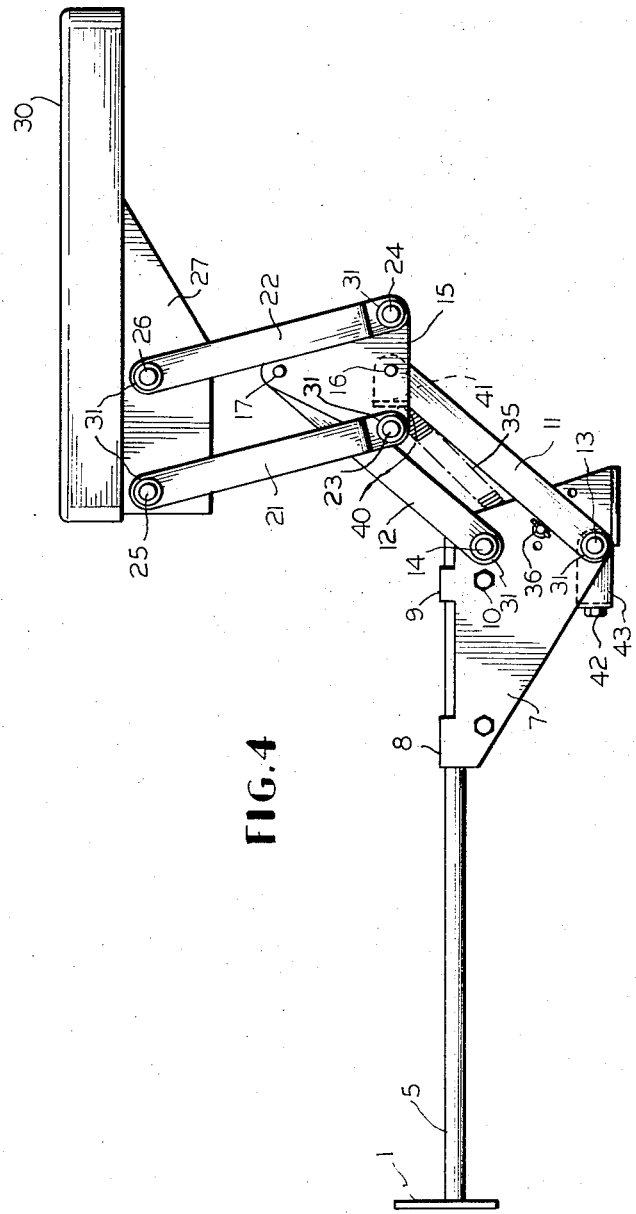

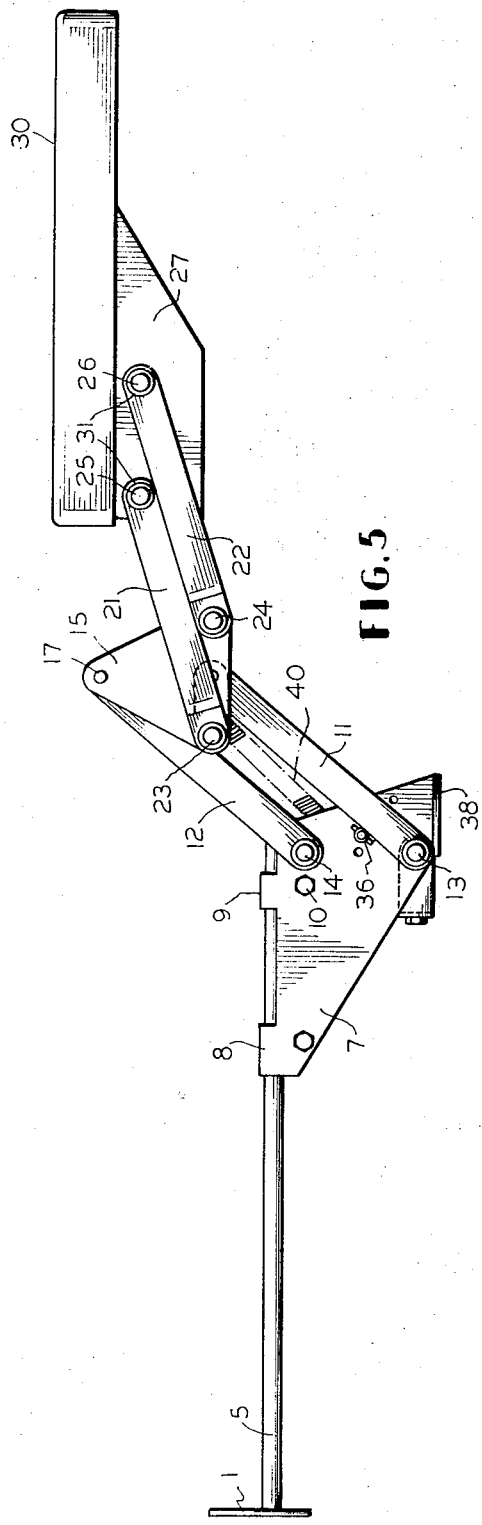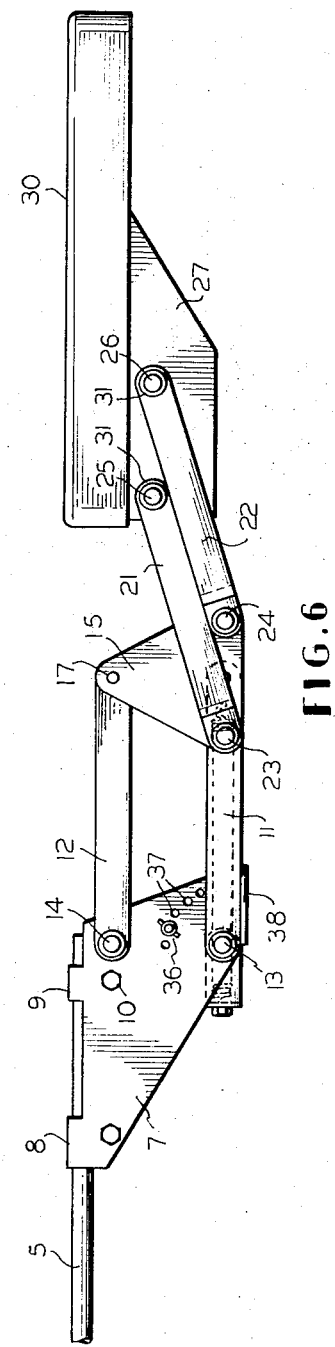

ADJUSTABLE SNACK TRAY

This invention relates to a new and improved shelf or tray and means for supporting and mounting the same in such a manner that the position of the shelf or tray may be adjusted both horizontally and vertically, but the shelf or tray remains level.

While not limited thereto, the shelf or tray of the present invention is particularly adapted and intended for installation in a motor vehicle, such as, a passenger car or truck, so as to provide a shelf or tray which may be permanently installed in the vehicle and which may be stored in a compact form underneath the cowl, or some other position out of the way of the occupants, but may readily be drawn out and raised or lowered so as to provide a firm and level tray or shelf, such as, a snack tray which can be positioned conveniently by the occupants of the vehicle to provide a snack tray on which to place food, beverages, or other articles and which, when such use has been completed, may be readily compacted and moved to its out-of-the-way storage position.

While many forms of snack trays or shelves have been suggested for use in motor vehicles, many of them suffer from the disadvantage that they cannot be securely attached so as to provide a firm and level support or cannot be positioned in such a manner as to be convenient to the occupants. Many such snack trays and shelves are completely removable from the vehicle and are held by hooks over the windows or other suitable portion of the vehicle. This may necessitate having a window open when the tray is in use, as otherwise it may be difficult to find a place to attach the tray. Other such snack trays which are adapted to be permanently installed in the vehicle suffer from the disadvantage that either they take up a great deal of space in the vehicle so as to be in the way of the driver or passenger when the tray or shelf is not in use or, if they are storable in an out of the way place, they can only be moved to essentially one or very few positions which may not be such as to be convenient for use by the driver or passenger.

It is, therefore, an object of the present invention to provide a shelf or tray which may be permanently installed in a motor vehicle.

A further object is to provide such a tray and suitable support means therefor that it may be stored out of the way in a compacted form.

A further object is to provide a tray which can be readily drawn out from its storage position and adjusted both in a horizontal direction and also in a vertical direction so as to be positioned conveniently to the driver and passenger.

A further object is to provide such a tray and mounting means therefore that the tray is always level when in use position.

Other and further objects will be apparent as the description progresses.

Reference should now be made to the drawings, in which like numbers are used to refer to like parts, and which illustrate a preferred embodiment of the present invention:

FIG. 3 is a side elevation showing the device fully extended on its horizontal guide but with the parallelogram linkages still in fully retracted position.

FIG. 4 is a side elevation showing both of the parallelogram linkages in essentially their maximum elevated position.

FIG. 5 is a side elevation showing the primary parallelogram linkages in essentially fully elevated position but the secondary parallelogram linkages in maximum horizontal extended position.

FIG. 6 is a side elevation showing both the primary and secondary parallelogram linkages in fully extended horizontal position.

Figure 2:
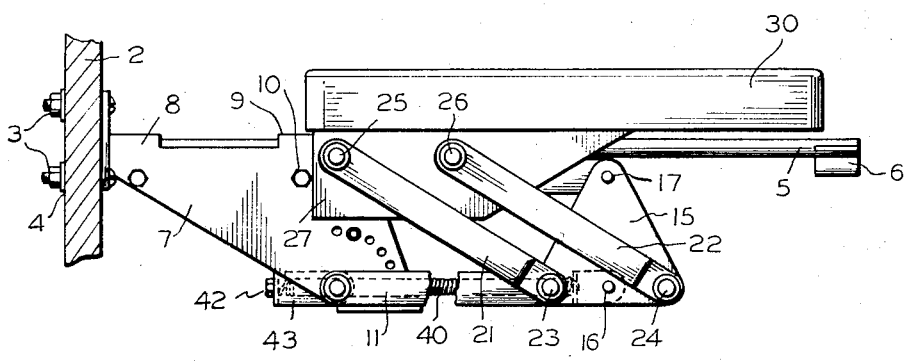
FIG. 2 is a side elevation of the device of the present invention in its stored position.

In the preferred embodiment of the device of the present invention illustrated in the drawings, a base plate 1 is mounted on and attached to a suitable wall of the vehicle, such as the firewall designated as 2, by screws, bolts or other suitable attaching means. A pair of stationary horizontal support and guide shafts, illustrated as rods 5 and 5' in the drawings, are attached to the base plate 1 in a position perpendicular thereto so that the rods 5 and 5' extend into the passenger compartment of the vehicle. A preferred manner of attaching the device of the present invention to a motor vehicle is shown in FIG. 2, wherein the ends of rods 5 and 5' at base plate 1 are of reduced diameter and threaded so as to extend through base plate 1 and fire wall 2 and are fastened by nut 3 and washer or bearing plate 4. At their outer ends, the rods 5 and 5' are preferably interconnected as by plate or strap 6 set into slots or mortises in the outer end of each of the rods. Thus, the rods are held in parallel relationship to each other and extend horizontally toward the passenger compartment of the vehicle.

A vertical slide plate 7 is slidably mounted on each of the horizontal rods 5 and 5' by bearings 8 and 9 on the slide plates. The slide plates 7 are transversely interconnected to each other as by bolt 10 so as to form a rigid supporting structure which is longitudinarily slidable along the support bars or guides 5 and 5'.

One end of each of a pair of primary parallel links 11 and 12 are mounted on and pivoted on the plates 7 by rivets 13 and 14 (FIGS. 4 to 6), with the pivots for the parallel links being preferably vertical with respect to each other as illustrated in the drawings.

At the other end, the primary parallel links 11 and 12, which are of equal length, are attached to and pivoted to a pivot member illustrated as triangular plate 15 in the drawings by means of suitable pivot elements such as rivets 16 and 17 respectively. Thus, the center line of links 11 and 12 and the lines connecting pivots 13 and 14 and pivots 16 and 17 form a parallelogram so that as the parallel links 11 and 12 are raised and lowered, the line connecting pivots 16–17 remains parallel to the line connecting pivots 13–14, i.e., as illustrated in the drawings both lines remain vertical.

One end of each of a pair of secondary parallel links 21 and 22 are attached to and pivoted on triangular plate 15 by rivets 23 and 24 respectively. As illustrated in the drawings, these pivots are preferably horizontally disposed with respect to each other. At their other end the secondary parallel links 21 and 22 are fixed to a vertical tray supporting plate 27 by rivets 25 and 26, respectively, which also serve as pivots. The secondary links 21 and 22 are of equal length so that the center line of the links 21 and 22 and the lines connecting pivots 23–24 and 25–26 constitute a parallelogram, thus as the links 21 and 22 are rotated around their pivots, the links remain parallel and the lines connecting pivots 23–24 and 25–26 also remain parallel (horizontal as illustrated in the drawings).

The two plates 27 on each side of the device are transversely interconnected to each other so as to form a rigid supporting structure for a tray or shelf which is illustrated in the drawings as tray 30 and which may be provided with indentations in its upper surface, such as indentations 32, 33, 34 and 35 illustrated in the drawings to hold cups, bottles, cans or other articles in a position convenient for use. It will be understood that the tray or shelf 30 may be integral with or permanently attached to the plates 27 or may be removably supported on the supporting structure of which plates 27 form a part.

Figure 1:
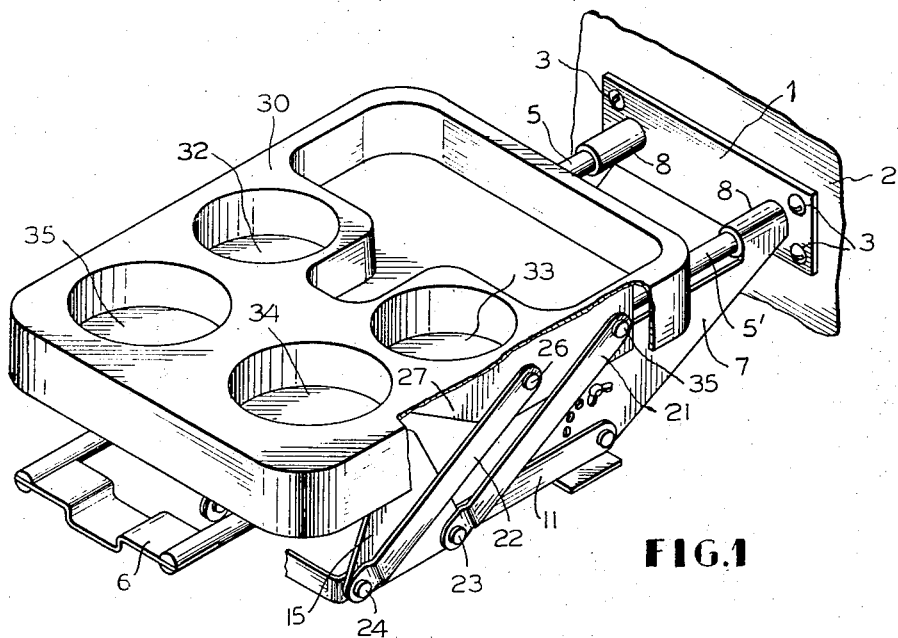
FIG. 1 is a perspective view of the device of the present invention in a motor vehicle.

When not in use, the device of the present invention may be stored out of the way of the occupants of the vehicle beneath the cowl and behind (engine-ward in the case of front-engine vehicles) the instrument panel in the compacted storage position illustrated in FIGS. 1 and 2.

When it is desired to use the device, the tray 30 may be pulled toward the passenger compartment so that plates 7 slide along supporting guide bars 5 and 5' and the entire unit (aside from the supporting guide bars 5 and 5') slides toward the passenger compartment. Once the tray 30 has been moved sufficiently into the passenger compartment so that on raising or lowering the same it will clear the instrument panel, the tray may be raised and its position adjusted vertically, and also further adjusted horizontally if necessary, by merely raising and lowering the tray with one hand. As the tray is raised or lowered or pulled further out horizontally, the primary parallel links 11 and 12 and/or the secondary parallel links 21 and 22 will pivot or swing around their pivots and support the tray in whatever position it may be placed.

Suitable means such as friction washers on each of the pivot heads for primary parallel links 11 and 12 and secondary links 21 and 22 are provided so as to retain both sets of parallel links, and thus the tray supported through them, in whatever position they may be set against such forces as are apt to be imposed on the tray or shelf 30. Such a friction washer, which may be either spring-loaded or made of elastomeric material, is indicated in the drawings as 31 on the rivets or pivot heads 13 and 14 for primary parallel links 11 and 12, respectively, and may also be provided on rivets or pivots 16 and 17 for these links (in a position not visible in the drawings). Such a friction washer is also indicated as 31 on rivets or pivots 23 and 25 for secondary parallel link 21 and rivets 24 and 26 for secondary parallel link 22 in the drawings. In place of friction washers, other means, such as tightening nuts (preferably wing nuts) for preventing or restraining rotation of some or all of the parallel links on their pivots may be provided on one or more of the rivets or bolts constituting the pivots for such parallel links, either in place of or in addition to friction washers on some or all of the pivot points.

An off center spring or springs may also be provided in order to assist in raising primary links 11 and 12 and retaining them in elevated position. This is illustrated as a tension spring 40 (FIGS. 2 and 5) one end of which is attached to a bracket 41 on parallel link 11, at a point near its pivot on the triangular shifting plate 15. The spring extends to and is attached at its other end to bolt 42 on bracket 43 the bottom edge of slide plate 7 at a position slightly cowlward (toward mounting plate 1) of pivot 13. Suitable stop means, such as bolt and wing nut 36 to be set in one of the holes 37, arranged in arcuate manner around pivot point 13 on plate 7 is preferably provided so that parallel link 11 can readily be raised to and held in whatever raised position is found to be most suitable for positioning the tray 30 convenient to the occupants. In place of a series of holes and a bolt and nut adapted to be set in one of them as illustrated in the drawings, it is obvious that an arcuate slot may be employed as may other suitable stop means.

Since it is usually not necessary that the primary parallel links 11 and 12 be placed in a position lower than horizontal from their pivots 13 and 14, it is preferred to provide suitable stop means, such as an outwardly extending flange 38 at the bottom of the slide plate 7, to provide a rest or stop for lowermost parallel link 11 (see FIGS. 5 and 6).

As previously described, the mounting plate 1 is affixed to the fire wall, preferably directly over the drive shaft for the vehicle. For storage the primary parallel links 11 and 12 are placed in horizontal position while the secondary parallel links 21 and 22 are adjusted to an inwardly elevated position approximately 67° from the vertical as illustrated in the drawings so that the tray 30 rests on slide members 7. The slides 7 are moved along guide bars 5 and 5' so that the end of bearing 8 rests against guideplate 1. In this position the entire device is underneath the cowl and behind (engine-ward) of the instrument panel and thus is out of the way of the occupants. For use, the slides 7 are pulled out longitudinally along guide bars 5 and 5' so that the tray 30 clears the instrument panel. The position of the tray 30 may then be adjusted manually both horizontally and vertically with resultant change or adjustment in the positions of the primary and secondary parallel links and/or the position of the slide plates 7 on guide bars 5 and 5'. The positions of the primary and secondary parallel links thus can be combined as desired along with any selected position of the slide plate 7 on the guide bars. These different positions can be obtained by pulling or raising the tray with one hand and are retained by the ring friction washers or other rotation preventing or retarding means which may be used in conjunction with or in place of the ring friction washers on some or all of the primary and/or secondary parallel links.

Once the tray 30 has been positioned conveniently for the occupants, it is usually advantageous to place the stop bolt and wing nut 36 in the appropriate hole 37 so that the primary parallel links 11 and 12 can readily always be moved to the same position and retained in such position by spring 40 and/or ring friction washers on the pivots for the primary parallel links. Similarly, stop means may be provided for any one or more of the secondary parallel links 21 and 22 either on pivot plate 15 or on plate 27 so that these links may readily be moved to a position which places the tray in a convenient position.

It will be apparent that, regardless of the particularly position to which the primary parallel links 11 and 12 and secondary links 21 and 22 are adjusted, the tray 30 will be held in a level and horizontal position suitable for receiving drinks, food, or other articles to be placed thereon.

It will be understood, of course, that the specific construction, illustrated in the drawings and heretofore described, represents a preferred embodiment of the device of the present invention and that various changes and modifications therein will suggest themselves to those skilled in the art. Thus, while a pair of laterally spaced apart guide rods 5 and 5' are preferred, it will be apparent that a single guide means of non-circular cross-section may be provided so that the plate 7, while longitudinally slidable thereon, cannot rotate therearound. Also, while it is preferred to provide a pair of primary and secondary parallel links at each side of the device, a single pair of each of said parallel links may be provided. However, a single guide rod or single pair of primary or secondary links if used would ordinarily have to be of substantially heavier construction than would a pair of two laterally set apart such members and, therefore, the construction shown in the drawings is usually preferred.

It will also be understood that, while the pivots for the primary parallel links 11 and 12 are preferably substantially vertically disposed with respect to each other, and those for secondary parallel links 21 and 22 are preferably horizontally disposed, it is not essential that such vertical and horizontal arrangements be used since the tray will be held in horizontal position with the pivots for the parallel links disposed in other than horizontal and/or vertical relationship to each other so long as both parallel links of each pair are of the same length, so that the center line of parallel links and the lines between their pivots at corresponding ends form a parallelogram.

It will also be apparent that, while the device is preferably permanently affixed to the motor vehicle, or other structure, to which it is to be attached, suitable brackets may be used so that the entire device can be lifted from the brackets and stored, such as in the trunk of the car.

Due to the depth of the space under the cowl in most modern motor vehicles, it is preferable to employ as a primary mounting a pair of horizontal bars, such as guide bars 5 and 5' heretofore described. However, for use in applications where the degree of horizontal adjustment provided by the use of such guide bars 5 and 5' is not required, they may be dispensed with and the mounting for the primary parallel links 11 and 12, illustrated as plates 7 in the drawings, may be employed as the primary mounting and affixed to the structure in which the device is to be used.

In applications where there is sufficient space above or below the mounting for the device, in its stored position, a hinged mounting plate can be used so that the device can either be rotated so as to lie against a vertical surface to which it has been affixed.

Other and further modifications will suggest themselves to those skilled in the art and may be made without departing from the spirit of the present invention or its scope which is defined in the appended claims.

What is claimed is:

1. A device for supporting a tray or shelf and permitting adjustment of position of such tray or shelf in both a vertical or horizontal direction while maintaining said tray or shelf level; which comprises a vertical support means, a pair of primary parallel links of equal length, means for pivotally attaching one end of each of said primary parallel links to said vertical support means in spaced apart position, a pivot member and means for pivotally attaching the other end of said primary parallel links to said pivot member, a pair of secondary parallel links of equal length, means for attaching one end of each of said pair of secondary parallel links to said pivot member, a second vertical support means and means for pivotally attaching the other end of said secondary parallel links to said second vertical support means and a horizontal and level tray affixed to said second vertical support means.

2. A device as defined in claim 1 and comprising in addition an elongated horizontal guide means, means for affixing said guide means to a structure and means for slidably mounting said first-mentioned vertical support means on said horizontal guide means so that said first-mentioned vertical support means is longitudinally slidable along said horizontal support means.

3. A device as defined in claim 2 wherein said horizontal guide means comprises a pair of laterally spaced apart horizontal bars, one of said first-mentioned vertical support means being slidably mounted on each of said horizontal bars and means interconnecting said first-mentioned vertical support means.

4. A device as defined in claim 3 having means for the restraining rotation of said primary parallel links and said secondary parallel links about their pivots.

5. A device as defined in claim 4 wherein said means for restraining rotation of said primary and secondary parallel links comprises a friction washer on the pivot heads for said links.

6. A device as defined in claim 4 having spring means for urging rotation of said primary parallel links from a horizontal to a vertical position.

7. A device as defined in claim 6 wherein said spring means comprise a tension spring attached to said first-mentioned vertical support means and extending to and attached to one of said primary parallel links at a point near said pivot means.

8. A device as defined in claim 7 having stop means mounted on said first-mentioned vertical support means for limiting rotation of said primary parallel links beyond a predetermined position.

9. A device as defined in claim 8 wherein said stop means comprise a bolt extending through said first-mentioned vertical support means and extending into the path of rotation of one of said primary parallel links around its pivot.

* * * * *